United States Patent [19]

Harakawa et al.

[11] 4,356,222
[45] Oct. 26, 1982

[54] FUSION-BONDABLE SHEET

[75] Inventors: Hiroshi Harakawa; Youtaro Fujiwara; Masaaki Matsushita; Seiko Tsutsui, all of Ichihara, Japan

[73] Assignee: Ube Industries, Ltd., Chiba, Japan

[21] Appl. No.: 308,089

[22] Filed: Oct. 2, 1981

[30] Foreign Application Priority Data

Oct. 7, 1980 [JP] Japan ............... 55-142274[U]

[51] Int. Cl.³ ............................................. B32B 3/14
[52] U.S. Cl. ................................. 428/78; 428/461; 428/516; 428/339; 428/346; 428/463; 428/517; 156/86
[58] Field of Search ............... 428/78, 215, 286, 515, 428/516, 346, 461, 920

[56] References Cited

U.S. PATENT DOCUMENTS 2,697,058 12/1954 Lasak ................................ 428/461
3,770,556 11/1973 Evans et al. ......................... 138/87

FOREIGN PATENT DOCUMENTS 53-130770 11/1978 Japan ................................ 428/76

Primary Examiner—George F. Lesmes
Assistant Examiner—B. K. Johnson
Attorney, Agent, or Firm—Burgess, Ryan and Wayne

[57] ABSTRACT

A fusion-bondable sheet is provided which is used as an overtape for covering a joint portion of a heat-shrinkable cover sheet applied onto a joint of steel pipe or cable and which is also used as a cover sheet for repairing a damaged protecting cover of a steel pipe. The fusion-bondable sheet comprises (a) a crosslinked polyolefin sheet, (b) a fusion-bondable layer formed on one surface of the crosslinked polyolefin sheet, which layer is mainly composed of a polyolefin having a melting point of 80°–200° C., a polyolefin having a melting point of 30°–75° C. and a tackifier, and (c) a flame-retardant sheet bonded to the other surface of the crosslinked polyolefin sheet through a binder or adhesive layer. Preferably, the flame-retardant sheet is larger in size than the crosslinked polyolefin sheet and the edges of the former sheet outwardly extend from the edges of the latter sheet.

13 Claims, 4 Drawing Figures

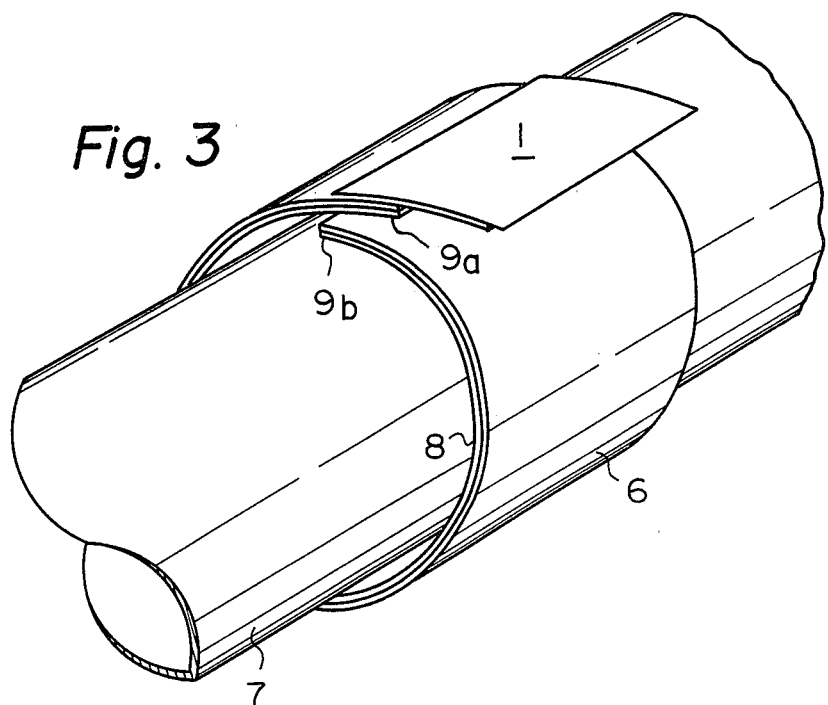
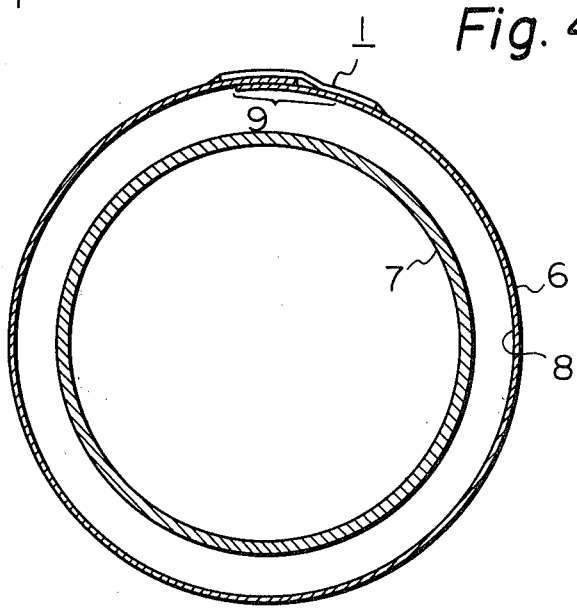

FUSION-BONDABLE SHEET

BACKGROUND OF THE INVENTION

(1) Field of the Invention

This invention relates to a heat-fusion-bondable sheet. More specifically, it relates to a fusion-bondable sheet which is used as an overtape for covering and connecting a joint portion of a heat-shrinkable cover sheet on both the ends thereof in the direction of thermal shrinkage when the heat-shrinkable cover sheet is wound on the periphery of a joint of a steel pipe or cable and heat-shrunk to cover the joint, or as a cover sheet for repairing the damaged portion of a polyethylene coating layer protecting and covering the peripheral surface of a steel pipe or for repairing the damaged portion of a heat-shrunk cover sheet wound on the periphery of a joint of a steel pipe or cable.

(2) Description of the Prior Art

When a heat-shrinkable cover sheet (often called "cover sheet" hereinafter for brevity) is used for covering the periphery of a joint, i.e., a joined portion, of a steel pipe or cable, there is ordinarily adopted a method in which the cover sheet is wound on the periphery of the joined portion, both the end portions in the direction of thermal shrinkage of the cover sheet are lapped over each other, an adhesive overtape is applied onto the lapped end portions, the overtape and the lapped end portions are sufficiently heated by applying a flame of a gas burner or the like from the outside of the overtape to integrally bond both the lapped end portions of the cover sheet and the overtape and form a cylindrical joint cover, and the cover sheet is entirely heated by a flame of a gas burner or the like to sufficiently effect thermal shrinkage and bond the inner face of the cover sheet closely to the peripheral face of the joined portion. A typical example of such an overtape is described in U.S. Pat. No. 3,770,556.

In order to integrally and strongly bond both the end portions of the cover sheet and the overtape and to thermally bond the lapped portions of the cover sheet to a joint of a steel pipe, it is necessary to perform heating at a very high temperature for a considerably long time by a flame of a gas burner or the like.

However, known overtapes used in the above-mentioned covering do not have high fire resistance, heat resistance and flame retardance sufficient to resist the above-mentioned heating. Furthermore, such known overtapes fail to have a high adhesiveness sufficient to strongly connect the lapped portions of the cover sheet against the force of thermal shrinkage of the cover sheet.

When a polyethylene cover layer protecting and covering the peripheral face of the barrel portion of a steel pipe is damaged, there is ordinarily adopted a repairing method in which the damaged portion is embedded with a thermoplastic resin, such as polyethylene, to flatten the damaged portion, an adhesive cover tape is applied to the damaged portion and the damaged portion is heated at a high temperature by applying a flame of a gas burner from the outside of the cover tape to cover the damaged portion, inclusive of the surrounding portion, with the cover tape. A known cover sheet or tape used in this repairing method, however, is poor in the fire resistance, heat resistance and flame retardancy, as is the above-mentioned known overtape, and it also involves a problem of an insufficient bonding strength to the damaged portion.

SUMMARY OF THE INVENTION

A primary object of the present invention is to provide a fusion-bondable cover sheet which does not have the various defects of the above-mentioned known overtapes or cover tapes and which is excellent in the fire resistance, heat resistance, flame retardancy and bonding strength.

Other objects and advantages of the present invention will be apparent from the following description.

In accordance with the present invention, there is provided a fusion-bondable sheet comprising a crosslinked polyolefin sheet, a fusion-bondable layer formed on one surface of the crosslinked polyolefin sheet, which layer is composed of a composition comprising as the main components a polyolefin having a melting point of 80° to 200° C., a polyolefin having a melting point of 30° to 75° C. and a tackifier, and a flame-retardant sheet bonded to the other surface of the crosslinked polyolefin sheet through a layer of a binder or adhesive.

BRIEF DESCRIPTION OF THE DRAWINGS

The fusion-bondable sheet of the present invention will now be described in detail with reference to the accompanying drawings.

FIG. 3 is a perspective view illustrating a state where, in a covering method using the fusion-bondable sheet of the present invention as an overtape, a heat-shrinkable cover sheet is wound around a joint of a steel pipe; and, FIG. 4 is a sectional view illustrating a state where both the end portions of the heat-shrinkable cover sheet wound around the steel pipe are bonded together with the fusion-bondable sheet of the present invention.

Referring to FIGS. 1 and 2, the fusion-bondable sheet 1 of the present invention comprises a crosslinked polyolefin sheet 4, a fusion-bondable layer 5 composed of the above-mentioned specific composition, which is formed on one surface of the crosslinked polyolefin sheet 4, and a flame-retardant sheet 2 bonded to the other surface of the crosslinked polyolefin sheet 4 through a layer 3 of a binder or adhesive.

Figure 1:
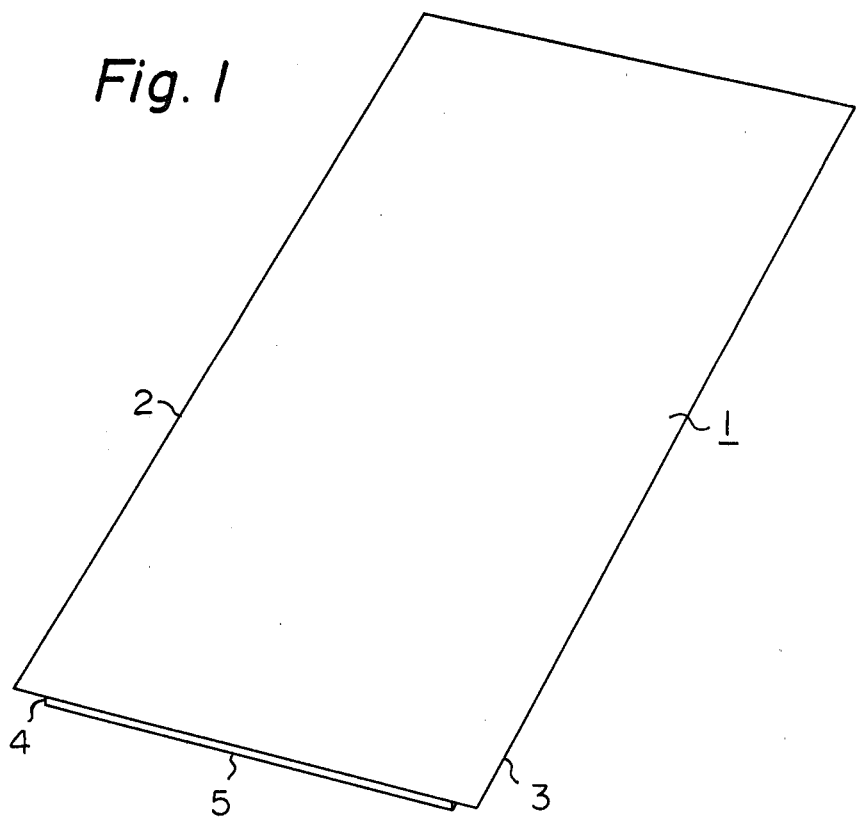
FIG. 1 is a perspective view illustrating one embodiment of the fusion-bondable sheet of the present invention.

The crosslinked polyolefin sheet 4 is a heat-resistant sheet obtained by irradiating a film or sheet of a polyolefin, such as polyethylene, polypropylene, an ethylene-propylene copolymer or an ethylene-vinyl acetate copolymer, with radioactive rays, for example, electron beams, to at least partially crosslink the polyolefin. The degree of crosslinking in the crosslinked polyolefin sheet is such that the degree of gel fraction is at least about 20%, preferably about 30 to about 100%, especially preferably about 35 to about 90%. It is preferred that the thickness of the crosslinked polyolefin sheet be about 0.05 to about 2 mm and especially about 0.07 to about 1 mm.

The crosslinked polyolefin sheet 4 has the fusion-bondable layer 5 formed on one surface thereof, and the fusion-bondable layer 5 is composed of a composition comprising as the main components a polyolefin having a melting point of 80° to 200° C., preferably 100° to 180° C., a polyolefin having a melting point of 30° to 75° C., preferably 35° to 70° C., and a tackifier. It is preferred that the thickness of the fusion-bondable layer 5 be about 50 to about 1500 microns and especially about 100 to about 1,000 microns.

As the polyolefin having a melting point of 80° to 200° C., which is used in the composition forming the above-mentioned fusion-bondable layer 5, there can be mentioned high-density polyethylene, low-density polyethylene, polypropylene, an ethylene-vinyl acetate copolymer, an ethylene-propylene copolymer, an ethylene-acrylic acid copolymer, and modified polyethylenes (for example, modified polyethylene having glycidyl groups introduced therein, modified polyethylene having carboxyl groups introduced therein and maleated polyethylene). As the polyolefin having a melting point of 30° to 75° C., there can be mentioned an ethylene-propylene copolymer, an ethylene-vinyl acetate copolymer, low-molecular-weight polyethylene, low-molecular-weight polypropylene and waxes. As the tackifier (adhesiveness imparting agent), there can be mentioned a petroleum hydrocarbon resin, a coumaro-neindene resin, a coumarone resin, a terpene resin, an aromatic hydrocarbon resin, natural rosin or its derivative, polybutene, natural rubber, polyisoprene rubber, polybutadiene rubber, styrene-butadiene copolymer rubber and ethylene-propylene-nonconjugated diene copolymer rubber.

The amounts used of the high-melting-point polyolefin (A), the low-melting-point polyolefin (B) and the tackifier (C) in the above-mentioned composition are preferably such that the (B)/(A) weight ratio is 0.05 to 5, especially 0.1 to 4, and the (C)/[(A)+(B)] weight ratio is 0.2 to 5, especially 0.5 to 3.

The above-mentioned composition may comprise an inorganic filler, such as talc, calcium carbonate, silica, alumina or carbon black, and an organic filler, such as cellulose or polyester fiber, in an amount of 1 to 20% by weight, especially 2 to 15% by weight. Furthermore, the composition may comprise an additive, such as an antioxidant, an ultraviolet absorber or a thermal stabilizer, in an amount of up to 2% by weight.

Formation of the fusion-bondable layer 5 on one surface of the crosslinked polyolefin sheet 4 is accomplished by extruding the above-mentioned composition from a T-die and laminating the molten film extrudate on one surface of the crosslinked polyolefin sheet.

As the flame-retardant sheet 2 bonded to the other surface of the crosslinked polyolefin sheet 4 through the binder or adhesive layer 3, there can be mentioned a foil of a metal such as aluminum or copper, and a plastic sheet having dispersed therein an inorganic fiber, such as glass fiber or asbestos. A flame-retardant sheet consisting of an aluminum foil is especially preferred in the present invention.

It is preferred that the thickness of the flame-retardant sheet be 0.01 to 2 mm and especially about 0.05 to about 1 mm. The sheet should have flexibility.

Any of the binders and adhesives having a bonding property or adhesiveness, even at a high temperature, and also having a heat resistance can be used for the binder or adhesive layer 3 for bonding the flame-retardant sheet 2 to the crosslinked polyolefin sheet 4. In the present invention, pressure-sensitive adhesives such as a silicone type adhesive and an acrylic resin type adhesive are preferably used.

Figure 2:
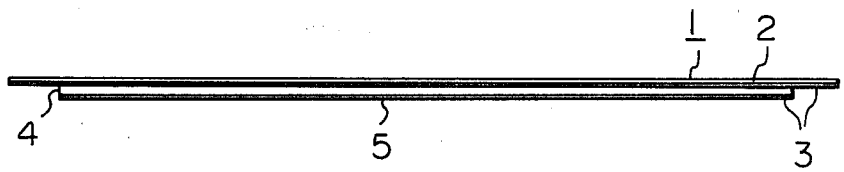
FIG. 2 is a sectional view illustrating the fusion-bondable sheet shown in FIG. 1.

In the fusion-bondable sheet 1 of the present invention, when the flame-retardant sheet 2 is bonded to the crosslinked polyolefin sheet 4, it is preferred that an adhesive-applied flame-retardant sheet having an adhesive layer previously formed on one surface be used. According to a preferred embodiment of the fusion-bondable sheet of the present invention, as shown in FIGS. 1 and 2, the size of the adhesive-applied flame-retardant sheet 2 is larger than that of the crosslinked polyolefin sheet 4, and the flame-retardant sheet 2 having the adhesive layer 3 is disposed so that the edges of the flame-retardant sheet 2 outwardly extend from the edges of the crosslinked polyolefin sheet 4 by 0.5 to 10 cm, more preferably about 0.5 to about 9 cm. According to this embodiment, the fusion-bondable sheet can be advantageously attached to a joint portion at room temperature by utilizing the adhesive layer (preferably composed of a pressure-sensitive adhesive) of the extending edge portions of the adhesive-applied flame-retardant sheet 2.

Furthermore, the fusion-bondable sheet of the present invention may be provided in a state where the fusion-bondable sheet is bonded to a heat-shrinkable cover sheet by bonding one of the above-mentioned extending edge portions of the adhesive-applied flame-retardant sheet 2 to the surface of one end portion of the heat-shrinkable cover sheet as illustrated in FIG. 3.

When the fusion-bondable sheet of the present invention is used as an overtape for covering a joint of steel pipes or cables with a heat-shrinkable cover sheet, there is adopted a method in which, as illustrated in FIG. 3, a heat-shrinkable cover sheet 6 is wound around the periphery of the joint of steel pipes 7, both the end portions 9a and 9b of the sheet 6 are lapped over each other, the overtape 1 is applied onto the lapped end portions so that the fusion-bondable layer 5 of the overtape 1 is located inside, and the assembly is heated from the outside of the flame-retardant sheet 2 of the overtape 1 by a flame of a gas burner, whereby both the end portions 9a and 9b of the cover sheet 6 are thermally fusion-bonded to the overtape 1 integrally therewith to form a cyclindrical heat-shrinkable cover sheet 6, as illustrated in FIG. 4.

Then, the cylindrical heat-shrinkable cover sheet 6 on the periphery of the steel pipe joint 7 is uniformly heated from the outside by a flame of a gas burner to thermally shrink the cover sheet 6 entirely and to adhere the cover sheet 6 closely to the peripheral face of the joint of the steel pipe 7, whereby the covering operation is completed.

Incidentally, after the operation of covering a joint of steel pipes or cables with a heat-shrinkable cover sheet has been completed, the flame-retardant sheet 2 of the overtape 1 of the present invention may be left in the covered portion as it is. When the fusion-bondable sheet having the flame-retardant sheet 2 bonded to the crosslinked polyolefin sheet 4 through the adhesive layer 3 is employed, the adhesive-applied flame-retardant sheet 2 may be peeled from the covered portion and used again. In this case, a sufficient covering property of the overtape is assuredly provided by the crosslinked polyolefin sheet alone.

The characteristic features and advantages of the fusion-bondable sheet of the present invention are as follows.

The fusion-bondable sheet of the present invention comprises a flame-retardant sheet as an outermost layer, and therefore, even if the fusion-bondable sheet of the present invention is directly heated by a flame of a gas burner in a manner as described above, combustion, carbonization or thermal deterioration is not caused in the fusion-bondable sheet of the present invention.

When the fusion-bondable sheet of the present invention is heated by a flame of a gas burner, the flame-retardant sheet as the outermost layer is first heated and the heat is conducted in sequence to the inner layers of the fusion-bondable sheet from the flame-retardant sheet and finally to the portion to be bonded by the fusion-bondable sheet. Accordingly, the bonding portion is heated relatively uniformly and bonding by the fusion-bondable sheet can be accomplished in good conditions.

Since the fusion-bondable sheet of the present invention comprises as the inner layer the hereinbefore mentioned crosslinked polyolefin sheet having good heat resistance and durability, the fusion-bondable sheet can be heated to a considerably high temperature and the fusion-bondable sheet bonded to various bonding portions can exert a covering or protecting effect durable for a sufficiently long time.

Furthermore, since the fusion-bondable sheet of the present invention comprises as the innermost layer a fusion-bondable layer composed of a composition comprising a polyolefin having a high melting point, a polyolefin having a low melting point and a tackifier, when the fusion-bondable sheet is entirely heated at a bonding temperature higher than about 100° C., it can be tightly bonded to the outer surface of a bonding portion by fusion bonding.

The most prominent characteristic feature of the fusion-bondable sheet of the present invention is that the sheet comprises a fusion-bondable layer composed of a composition comprising the above-mentioned specific components in combination.

Accordingly, when the temperature of heating the fusion-bondable sheet of the present invention is gradually elevated in the range of from about 80° to about 200° C., parts of the respective components of the fusion-bondable layer are gradually fused and the viscosity is gradually reduced from a high level to a low level. In the case of a fusion-bondable layer consisting solely of a polyolefin having a high or low melting point, the layer is abruptly fused at a certain temperature and the viscosity is drastically reduced at this temperature, with the result that the fusion-bondable sheet is readily peeled from the bonding portion. By virtue of the above-mentioned characteristic feature of the fusion-bondable layer in the fusion-bondable sheet of the present invention, occurrence of this undesirable phenomenon can be avoided. Furthermore, when the fusion-bondable sheet of the present invention is employed, the bonding temperature can be reduced to a level much lower than the bonding temperature to be adopted for a fusion-bondable sheet comprising a fusion-bondable layer consisting solely of a polyolefin having a high melting point.

When the fusion-bondable layer of the fusion-bondable sheet of the present invention is heated at a bonding temperature and is then cooled, the bonding strength of the bonding portion at temperatures of up to about 80° C. is higher than that of the fusion-bondable layer consisting solely of a polyolefin having a high melting point.

As is apparent from the foregoing description, since the fusion-bondable sheet of the present invention has a fusion-bondable layer having a low bonding temperature, the time required for heating can be shortened and the covering operation can be performed smoothly even in relatively cold surroundings. Moreover, since the fusion-bondable layer of the fusion-bondable sheet of the present invention has a high bonding strength not only at temperatures approximating room temperature, but also at relatively high temperatures (up to about 80° C.), even if the bonding portion (a joint or body portion of a steel pipe) is exposed to a high temperature or if a high-temperature fluid flows through the steel pipe, the fusion-bondable sheet of the present invention is not easily separated from the bonding portion.

The present invention will now be described with references to the following Examples. In the Examples, the melting point was determined according to the following method.

A differential thermal analyzer (Thermal Analyzer Model No. 990 supplied by Du Pont Co.) was used, and the sample polymer was gradually heated from room temperature at a temperature-elevating rate of 10° C./min and the absorption of heat was measured. The temperature at which the absorption peak was observed was designated as the melting point.

EXAMPLE 1

Crosslinked polyethylene having a degree of gel fraction of 60% and a density of 0.927 g/cm$^3$ was prepared in the form of a sheet having a thickness of 0.3 mm as a crosslinked polyolefin sheet, and a fusion-bondable layer having a thickness of 0.2 mm was formed on one surface of the crosslinked polyethylene sheet by extrusion lamination of a composition comprising 100 parts by weight of low-density polyethylene having a melting point of 106° C. and a density of 0.925 g/cm$^3$, 50 parts by weight of an ethylenepropylene copolymer having a melting point of 50° C. and 100 parts by weight of a coumarone resin. Aluminum foil having a thickness of 0.2 mm and including an acrylic resin type adhesive layer having a thickness of 0.1 mm was bonded to the other surface of the crosslinked polyethylene sheet so that the adhesive layer was located inside, whereby a fusion-bondable sheet was prepared. The edges of the aluminum foil extended from the edges of the crosslinked polyethylene sheet by 5 cm.

This fusion-bondable sheet was applied to a damaged portion of a polyethylene cover layer on the peripheral face of the barrel portion of a steel pipe and was heated for about 2 minutes by a flame of a gas burner to elevate the temperature of the bonding face to 120° C. and effect bonding. Then, the sheet was gradually cooled and the covering was thus completed.

Combustion, carbonization or thermal deterioration was not caused in the fusion-bondable sheet by the above-mentioned heating with a flame of the gas burner.

The bonding strength (peel strength as determined at a peeling angle of 180°) between the surface of the damaged portion of the polyethylene cover layer of the steel pipe and the surface of the fusion-bondable layer of the fusion-bondable sheet was 0.5 kg/cm as measured at 50° C. and 0.7 kg/cm as measured at 30° C.

When the mixing ratio of the respective components in the composition of the fusion-bondable layer was appropriately selected, the bonding temperature could be reduced to 100° C., and the peel strength obtained was 0.5 to 2 kg/cm as measured at 80° C., 2 to 4 kg/cm as measured at 50° C. and 3 to 7 kg/cm at room temperature (25° C.).

COMPARATIVE EXAMPLE 1

A fusion-bondable sheet was prepared in the same manner as described in Example 1, except that only low-density polyethylene having a density of 0.925 g/cm³ and a melting point of 106° C. was used for the fusion-bondable layer of the fusion-bondable sheet.

A damaged portion of a polyethylene cover layer of a steel pipe was covered in the same manner as described in Example 1, except that the so-obtained fusion-bondable sheet was used. The bonding strength between the surface of the damaged portion of the polyethylene cover layer and the fusion-bondable layer of the fusion-bondable sheet was substantially zero, as determined either at 50° C. or at 30° C., and the fusion-bondable sheet was easily separated.

When heating by the gas burner was conducted for more than 10 minutes and the temperature of the bonding surface was elevated to about 150° C., the damaged portion could be covered with the above-mentioned fusion-bondable sheet. However, the bonding strength of the bonding surface of the fusion-bondable sheet was substantially zero at a temperature higher than 50° C. and about 1 to about 2 kg/cm at temperatures approximating room temperature (25° C.).

We claim:

1. A fusion-bondable sheet comprising a crosslinked polyolefin sheet, a fusion-bondable layer formed on one surface of the crosslinked polyolefin sheet, which layer is composed of a composition comprising as the main components a polyolefin having a melting point of 80° to 200° C., a polyolefin having a melting point of 30° to 75° C. and a tackifier, and a flame-retardant sheet bonded to the other surface of the crosslinked polyolefin sheet through a layer of a binder or adhesive.

2. A fusion-bondable sheet according to claim 1 wherein the crosslinked polyolefin sheet is prepared by irradiating a polyolefin with radio active rays and has a degree of gel fraction of at least about 20%.

3. A fusion-bondable sheet according to claim 2 wherein the polyolefin is selected from the group consisting of polyethylene, polypropylene, an ethylene-propylene copolymer and an ethylene-vinyl acetate copolymer.

4. A fusion-bondable sheet according to claim 1 wherein the crosslinked polyolefin sheet has a thickness of from about 0.05 to about 2 mm.

5. A fusion-bondable sheet according to claim 1 wherein the fusion-bondable layer is composed of a composition comprising as the main components a polyolefin having a melting point of 100° to 180° C., a polyolefin having a melting point of 35° to 70° C. and a tackifier.

6. A fusion-bondable sheet according to claim 1 or 5 wherein the amounts of the high-melting-point polyolefin (A), the low-melting-point polyolefin (B) and the tackifier (C) are such that the ratio of (B)/(A) is in the range of from 0.05 to 5 by weight and the ratio of (C)/[(A)+(B)] is in the range of from 0.2 to 5 by weight.

7. A fusion-bondable sheet according to claim 1 wherein the fusion-bondable layer has a thickness of about 50 to 1500 microns.

8. A fusion-bondable sheet according to claim 1 wherein the polyolefin having a melting point of 80° to 200° C. is selected from the group consisting of polyethylene, polypropylene, an ethylene-vinyl acetate copolymer, an ethylene-propylene compolymer, an ethylene-acrylic acid copolymer and modified polyethylenes.

9. A fusion-bondable sheet according to claim 1 wherein the polyolefin having a melting point of 30° to 75° C. is selected from the group consisting of an ethylene-propylene copolymer, an ethylene-vinyl acetate copolymer, a low-molecular weight polyethylene, a low-molecular weight polypropylene and waxes.

10. A fusion-bondable sheet according to claim 1 wherein the tackifier is selected from the group consisting of a petroleum hydrocarbon resin, a coumarone-indene resin, a coumarone resin, a terpene resin, an aromatic hydrocarbon resin, natural resin and its derivatives, polybutene, natural rubber, polyisoprene rubber, polybutadiene rubber, styrene-butadiene copolymer rubber and ethylene-propylene-nonconjugated diene copolymer rubber.

11. A fusion-bondable sheet according to claim 1 wherein the flame-retardant sheet is selected from metal foils and plastic sheets having inorganic fibers dispersed therein and has a thickness of 0.01 to 2 mm.

12. A fusion-bondable sheet according to claim 1 wherein the flame-retardant sheet having the binder or adhesive layer has a size larger than that of the crosslinked polyolefin sheet, and the edges of the flame-retardant sheet outwardly extend from the edges of the crosslinked polyolefin sheet by 0.5 to 10 cm.

13. A fusion-bondable sheet according to claim 12 wherein said binder or adhesive layer is composed of a pressure-sensitive adhesive.

* * * * *